US012658465B2

(12) United States Patent
Hosokawa et al.

(10) Patent No.: US 12,658,465 B2
(45) Date of Patent: Jun. 16, 2026

(54) SECONDARY BATTERY WITH MULTIPLE CURRENT COLLECTION TABS

(71) Applicant: SANYO Electric Co., Ltd., Kadoma (JP)

(72) Inventors: Takashi Hosokawa, Hyogo (JP); Tomoyuki Yamada, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 934 days.

(21) Appl. No.: 17/914,169

(22) PCT Filed: Feb. 8, 2021

(86) PCT No.: PCT/JP2021/004624
§ 371 (c)(1),
(2) Date: Mar. 17, 2023

(87) PCT Pub. No.: WO2021/192664
PCT Pub. Date: Sep. 30, 2021

(65) Prior Publication Data
US 2023/0238564 A1 Jul. 27, 2023

(30) Foreign Application Priority Data

Mar. 26, 2020 (JP) ................................ 2020-055371

(51) Int. Cl.
*H01M 10/04* (2006.01)
*H01M 50/184* (2021.01)
(Continued)

(52) U.S. Cl.
CPC ..... *H01M 10/0431* (2013.01); *H01M 50/184* (2021.01); *H01M 50/538* (2021.01); *H01M 50/545* (2021.01)

(58) Field of Classification Search
CPC ........... H01M 10/0431; H01M 50/538; H01M 50/545; H01M 50/184
See application file for complete search history.

(56) References Cited

U.S. PATENT DOCUMENTS

2014/0113185 A1 4/2014 Mori et al.
2015/0214527 A1 7/2015 Park
(Continued)

FOREIGN PATENT DOCUMENTS

CN 103620824 A 3/2014
CN 105917512 A 8/2016
(Continued)

OTHER PUBLICATIONS

JP 2014060045 English Translation (Year: 2014).*
(Continued)

*Primary Examiner* — Jimmy Vo
(74) *Attorney, Agent, or Firm* — WHDA, LLP

(57) ABSTRACT

At one edge of a positive electrode plate in a winding axis direction of an electrode body, two positive electrode tabs per turn are provided to protrude from the edge. At the other edge of a negative electrode plate in the winding axis direction of the electrode body, two negative electrode tabs per turn are provided to protrude from the edge. The multiple positive electrode tabs provided to protrude from the positive electrode plate include multiple types of positive electrode tabs having different protrusion lengths and proximal end widths, and the multiple negative electrode tabs provided to protrude from the negative electrode plate include multiple types of negative electrode tabs having different protrusion lengths and base end widths.

6 Claims, 10 Drawing Sheets

(51) Int. Cl.
 H01M 50/538 (2021.01)
 H01M 50/545 (2021.01)

(56) References Cited

U.S. PATENT DOCUMENTS

| | | |
|---|---|---|
| 2016/0197379 A1 | 7/2016 | Jung |
| 2016/0218343 A1 | 7/2016 | Kim et al. |
| 2016/0336576 A1 | 11/2016 | Shinoida et al. |

FOREIGN PATENT DOCUMENTS

| | | | |
|---|---|---|---|
| EP | 3157093 A1 | | 4/2017 |
| JP | 2014060045 A | * | 4/2014 |
| JP | 2015-141847 A | | 8/2015 |
| JP | 2016-139596 A | | 8/2016 |
| JP | 2017050069 A | * | 3/2017 |
| JP | 2019-061779 A | | 4/2019 |
| JP | 2019212434 A | * | 12/2019 |
| JP | 2021028896 A | * | 2/2021 |
| WO | 2013/001821 A1 | | 1/2013 |
| WO | 2015/190302 A1 | | 12/2015 |

OTHER PUBLICATIONS

JP 2019212434 English Translation (Year: 2019).*
JP 2021028896 English Translation (Year: 2021).*
Office Action dated Nov. 29, 2022, issued in counterpart IN Application No. 202247041466, with English Translation. (5 pages).
International Search Report dated Apr. 20, 2021, issued in counterpart international application No. PCT/JP2021/004624 (3 pages).
Machine translation of JP2014-060045A; Cited in ID Office Action dated Mar. 27, 2023. (Original and Abstract have been filed in prior IDS.).
Hearing Notice dated Mar. 20, 2025, issued in counterpart Indian Application No. 202247041466. (3 pages).
English translation of Search Report dated Dec. 20, 2023, issued in counterpart CN Application No. 202180021068.6. (3 pages).
Extended (Supplementary) European Search Report dated May 8, 2024, issued in counterpart Application No. 21775169.2. (9 pages).

* cited by examiner

FIG.1

SECOND REAR SIDE
WALL SIDE
⟷
SECOND FRONT SIDE
WALL SIDE

SECOND
FRONT SIDE
WALL SIDE

SECOND
REAR SIDE
WALL SIDE

SECONDARY BATTERY WITH MULTIPLE CURRENT COLLECTION TABS

TECHNICAL FIELD

The present disclosure relates to a secondary battery including an electrode body which includes a strip-like positive electrode plate, a strip-like negative electrode plate, and a strip-like separator, and the positive electrode plate and the negative electrode plate are wound with the separator interposed therebetween.

BACKGROUND

Patent Document 1 discloses a secondary battery including an electrode body which includes a strip-like positive electrode plate, a strip-like negative electrode plate, and a strip-like separator. The positive electrode plate and the negative electrode plate are wound with the separator interposed therebetween In this secondary battery, one current collection tab per turn is provided to protrude from one edge of the positive electrode plate in a winding axis direction of the electrode body and the other edge of the negative electrode plate in the winding axis direction.

CITATION LIST

Patent Document

PATENT DOCUMENT 1: Japanese Unexamined Patent Publication No. 2016-139596

SUMMARY OF THE INVENTION

In Patent Document 1, only one current collection tab is provided at each turn of the positive electrode plate and the negative electrode plate. For this reason, variation in a distance from each portion in the electrode plate to the current collection tab is great. This leads to a greater potential difference in the electrode plate, and as a result, deterioration of the electrode plate tends to progress. Thus, the durability of the secondary battery decreases.

There has been also a demand for increasing the output current of the secondary battery.

A secondary battery of the present disclosure is a secondary battery including an electrode body which includes a strip-like positive electrode plate, a strip-like negative electrode plate, and a strip-like separator, the positive electrode plate and the negative electrode plate being wound with the separator interposed therebetween. At least two current collection tabs per turn are provided to protrude from one edge of the positive electrode plate in a winding axis direction of the electrode body and the other edge of the negative electrode plate in the winding axis direction, the multiple current collection tabs provided to protrude from the positive electrode plate include multiple types of current collection tabs different from each other in at least one of a protrusion length or a proximal end width, and the multiple current collection tabs provided to protrude from the negative electrode plate include multiple types of current collection tabs different from each other in at least one of a protrusion length or a proximal end width.

According to the present disclosure, the durability of the secondary battery can be enhanced, and the output current of the secondary battery can be increased.

BRIEF DESCRIPTION OF THE DRAWINGS

FIG. 1 is a perspective view of a non-aqueous electrolyte secondary battery according to an embodiment of the present disclosure.

FIG. 8 is a view before bending of distal end regions of positive electrode tabs, corresponding to FIG. 6.

DESCRIPTION OF EMBODIMENT

Hereinafter, an embodiment of the present disclosure will be described in detail with reference to the drawings. The following description of advantageous embodiments is a mere example in nature, and is not at all intended to limit the scope, application, or use of the present disclosure.

Figure 1:
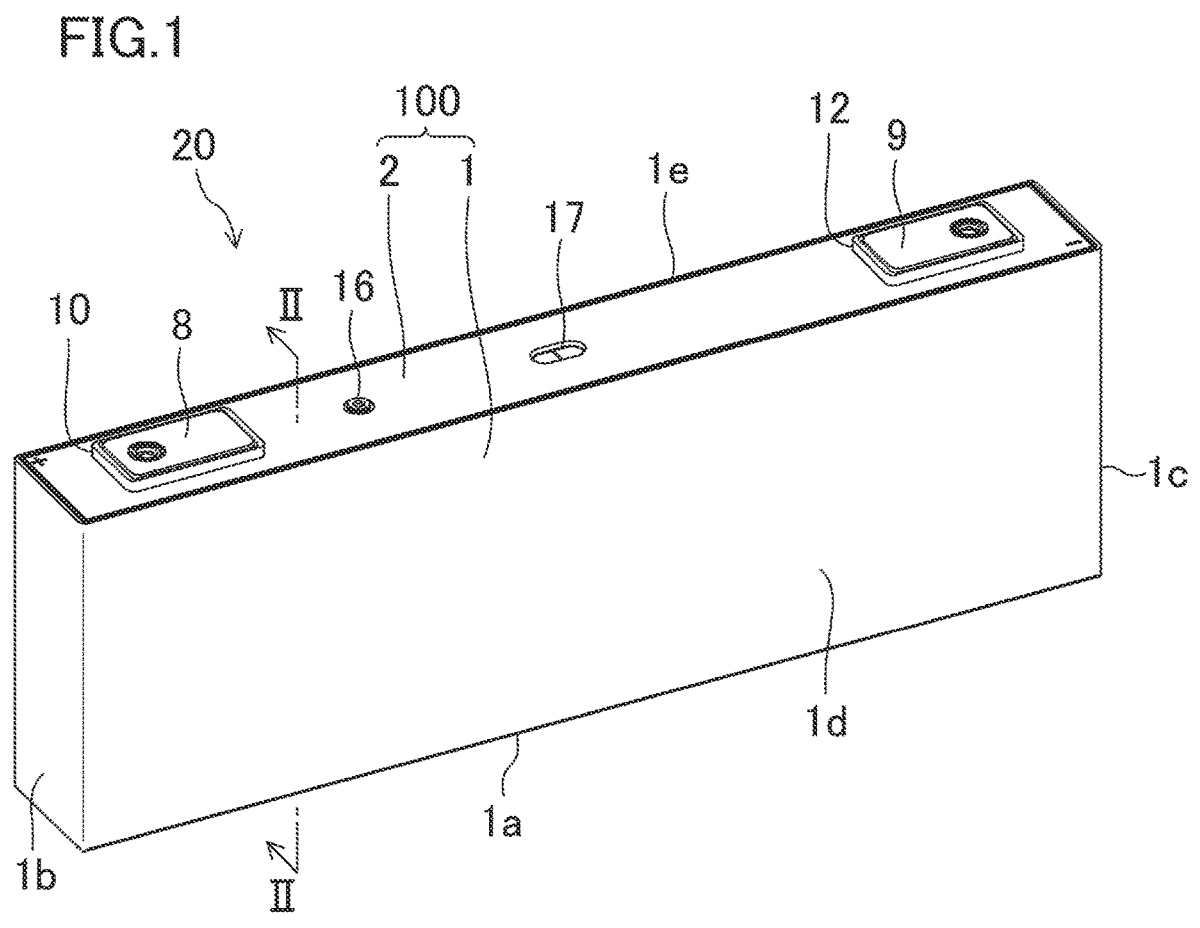
Figure 2:
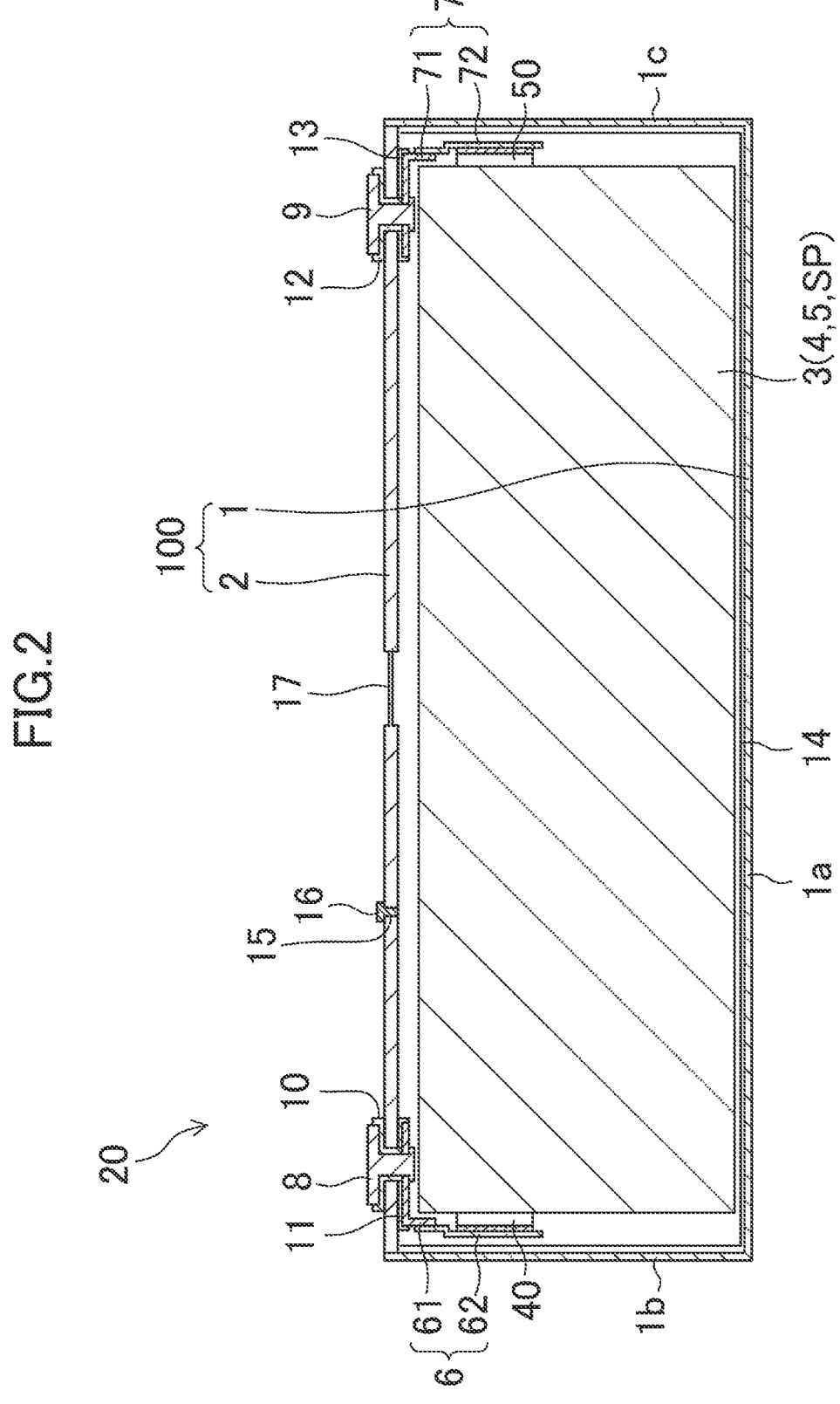
FIG. 2 is a cross-sectional view taken along line II-II of FIG. 1.

FIG. 1 is a perspective view showing a non-aqueous electrolyte secondary battery 20 according to the present disclosure. FIG. 2 is a cross-sectional view taken along line II-II in FIG. 1. As shown in FIGS. 1 and 2, the non-aqueous electrolyte secondary battery 20 includes a battery case 100 having a rectangular exterior body 1 having an opening and having a bottomed rectangular tube shape and a sealing plate 2 sealing the opening of the rectangular exterior body 1. The rectangular exterior body 1 and the sealing plate 2 are each made of metal in a preferred embodiment and aluminum or iron in a more preferred embodiment.

The rectangular exterior body 1 has a bottom 1a, a pair of first side walls 1b, 1c, a second front side wall 1d, and a second rear side wall 1e. The first side walls 1b, 1c in pair are arranged to face each other in parallel. The second front side wall Id and the second rear side wall 1e are arranged to face each other in parallel. The pair of first side walls 1b, 1c is perpendicular to the longitudinal direction of the sealing plate 2, and the area of the pair of first side walls 1b, 1c is smaller than those of the second front side wall 1d and the second rear side wall 1e.

Figure 3:
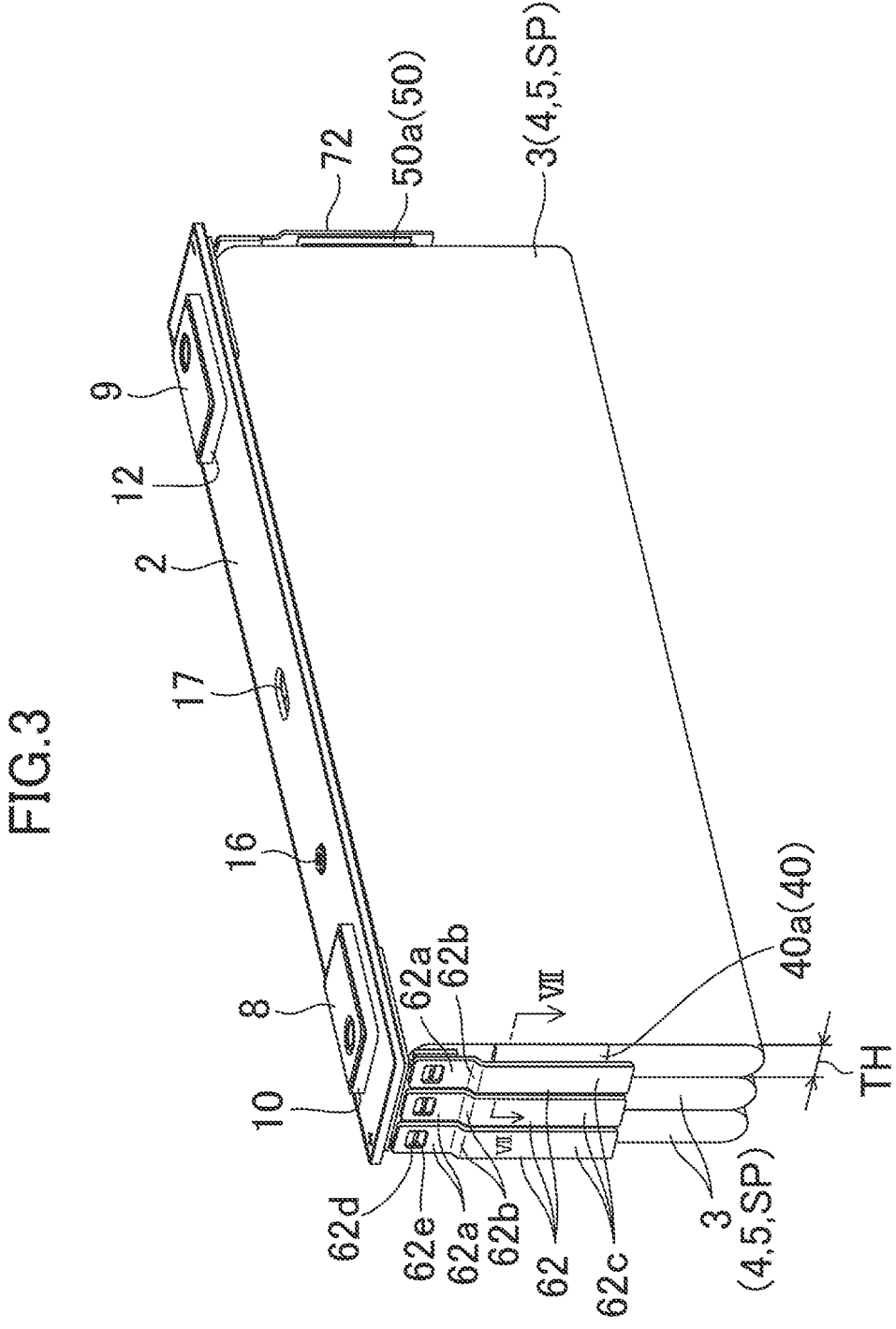
FIG. 3 is a view of a sealing plate and an electrode body group including multiple electrode bodies.
Figure 4:
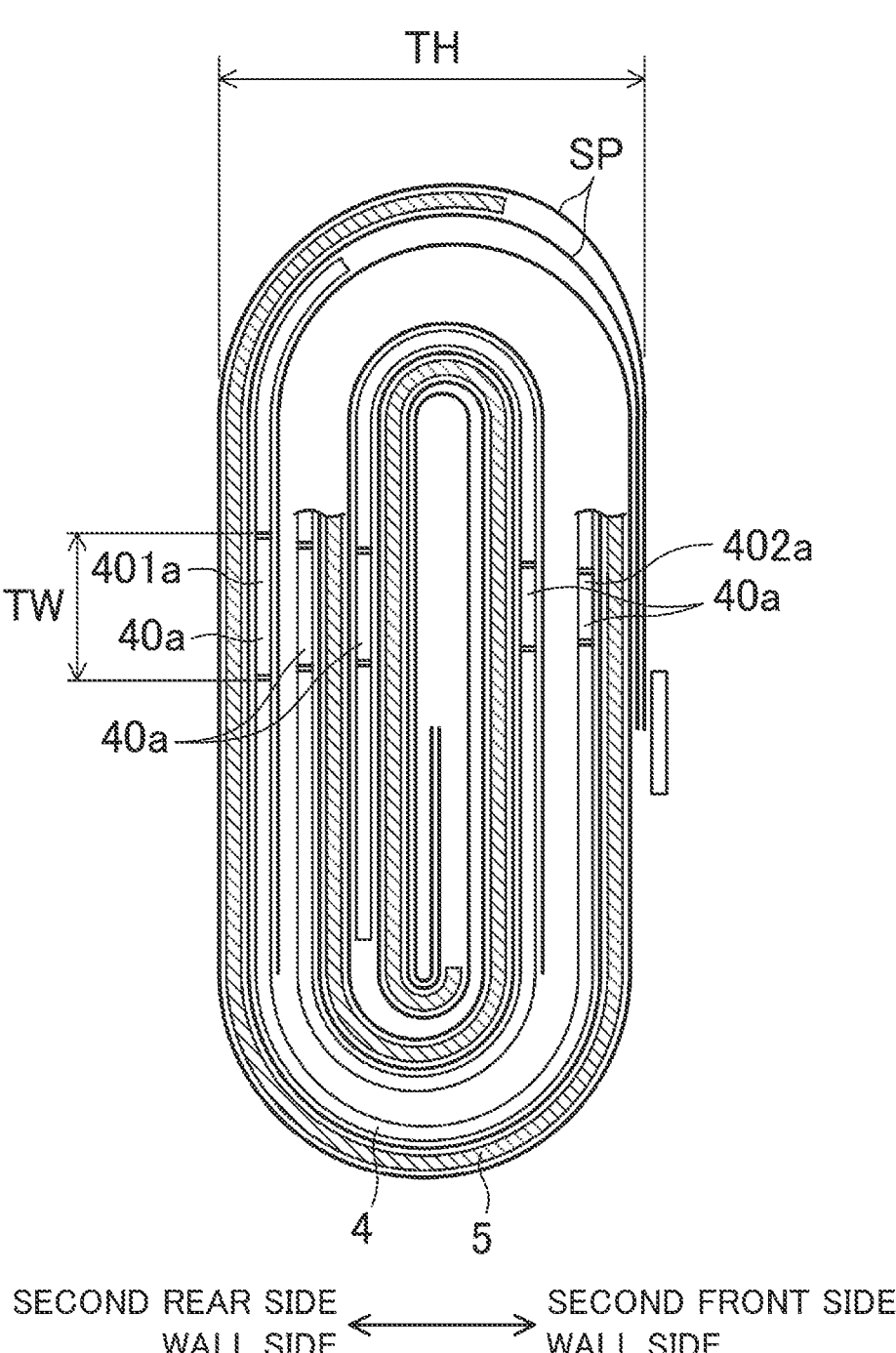
FIG. 4 is a schematic plan view of the electrode body as viewed from the sealing plate.

As shown in FIG. 3, in the rectangular exterior body 1, three electrode bodies 3 including positive electrode plates 4 and negative electrode plates 5 are housed together with an electrolyte. As shown in FIG. 4, the electrode body 3 is a flat electrode body configured such that the positive electrode plate 4 and the negative electrode plate 5 are wound with a separator SP interposed therebetween. The winding axis of the electrode body 3 extends perpendicularly to the first side walls 1b, 1c and parallel with the second front side wall 1d and the second rear side wall 1e. The thickness TH of the electrode body 3 is set to 12 mm.

Figure 5:
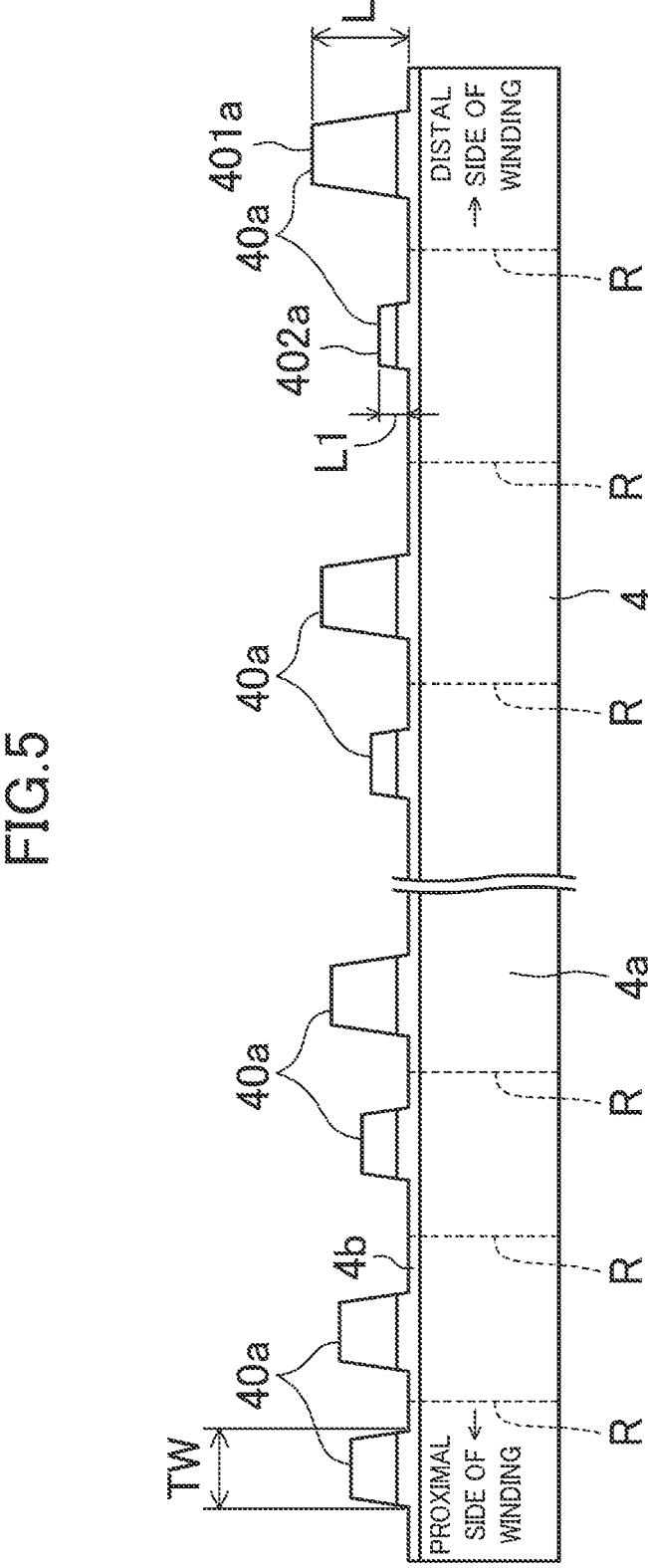
FIG. 5 is a schematic plan view of the electrode body in an unfolded state.
Figures 6, 7A, 7B:
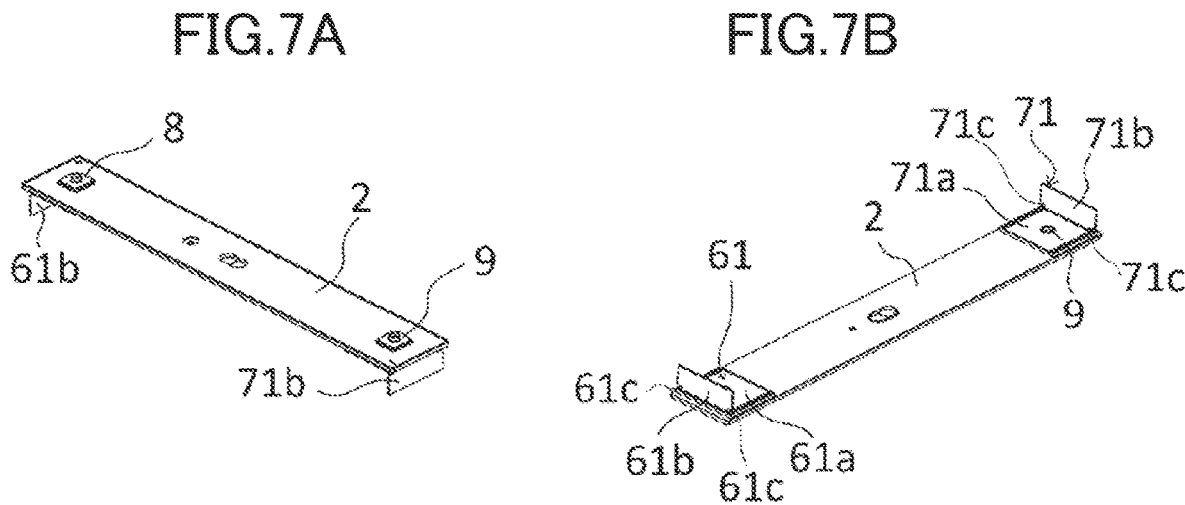
FIG. 6 is a cross-sectional view taken along line VI-VI of FIG. 3.
FIG. 7A is a perspective view of the sealing plate to which a positive electrode terminal, a first positive electrode current collector, a negative electrode terminal, and a first negative electrode current collector are attached, as viewed from the outer surface of the battery.
FIG. 7B is a perspective view of the sealing plate to which a positive electrode terminal, a first positive electrode current collector, a negative electrode terminal, and a first negative electrode current collector are attached, as viewed from the inner surface of the battery.

At one edge of the positive electrode plate 4 in a winding axis direction of the electrode body 3, two positive electrode tabs 40a as current collection tabs per turn are, as shown in FIGS. 4 to 6, integrally provided to protrude from the edge and overlap with each other. The positive electrode tabs 40a are each formed into a trapezoidal plate shape with a width gradually increasing from the distal end toward the proximal end. These multiple positive electrode tabs 40a are stacked to form a positive electrode tab group 40. In FIG. 5, the middle of a rounded portion at which the positive electrode plate 4 is curved is indicated by a reference character R.

The multiple positive electrode tabs 40a provided to protrude from the positive electrode plate 4 include multiple types of positive electrode tabs 40a having different protrusion lengths and proximal end widths. Specifically, the protrusion length of each positive electrode tab 40a gradually increases toward a second rear side wall 1e (one side of the electrode body 3 in the thickness direction). Thus, the protrusion length L2 of the positive electrode tab 40a protruding from position closest to the second rear side wall 1e among all of the positive electrode tabs 40a is longer than the protrusion length L1 of the positive electrode tab 40a protruding from position closest to a second front side wall 1d (the other side in the thickness direction of the electrode body 3) among all of the positive electrode tabs 40a. In FIGS. 4 and 5, the positive electrode tab 40a protruding from position closest to the second rear side wall 1e among all of the positive electrode tabs 40a is indicated by reference numeral 401a, and the positive electrode tab 40a protruding from position closest to the second front side wall 1d among all of the positive electrode tabs 40a is indicated by reference numeral 402a. In addition, the proximal end width TW of the positive electrode tab 40a increases as the protrusion length of the positive electrode tab 40a increases. The protrusion length L1 of the positive electrode tab 40a having the shortest protrusion length, i.e., the positive electrode tab 402a positioned closest to the second front side wall 1d side, is set to 12 mm and the protrusion length L2 of the positive electrode tab 401a having the longest protrusion length, i.e., the positive electrode tab 40a positioned closest to the second rear side wall 1e side, is set to 21 mm.

The vicinities of the distal ends of all of the positive electrode tabs 40a are connected to each other by welding with their plate surfaces facing substantially the same direction, thereby forming a connection portion 63. In the present embodiment, the portions slightly apart from the distal ends of all of the positive electrode tabs 40a form the connection portion 63, but distal end portions of all of the positive electrode tabs 40a may form the connection portion 63.

The positive electrode plate 4 has a region where a positive electrode active material layer 4a is formed on each of both surfaces of a positive electrode core. The positive electrode tab 40a consists of a positive electrode core exposed portion. A positive electrode protective layer 4b having a lower conductivity than that of the positive electrode active material layer 4a is provided at a base portion of the positive electrode tab 40a. The positive electrode protective layer 4b may include, for example, an insulating layer made of resin and a layer containing ceramic and a resin binder. The positive electrode protective layer 4b may contain an electroconductive material such as a carbon material. The positive electrode protective layer 4b is not necessarily provided.

At the other edge (a side opposite to the positive electrode tab 40a) of the negative electrode plate 5 in the winding axis direction of the electrode body 3, two negative electrode tabs 50a as current collection tabs per turn are provided to protrude from the edge. These negative electrode tabs 50a are in a shape bilaterally symmetrical to the positive electrode tabs 40a about the center cross section of the electrode body 3 in the winding axis direction. Thus, the multiple negative electrode tabs 50a provided to protrude from the negative electrode plate 5 include multiple types of negative electrode tabs 50a having different protrusion lengths and proximal end widths. These multiple negative electrode tabs 50a are stacked to form a negative electrode tab group 50.

The negative electrode plate 5 has a region where a negative electrode active material layer is formed on each of both surfaces of a negative electrode core. The negative electrode tab 50a consists of a negative electrode core exposed portion.

A positive electrode terminal 8 and a negative electrode terminal 9 as electrode terminals are attached to the sealing plate 2. The positive electrode terminal 8 is electrically connected to the positive electrode tab group 40 through a positive electrode current collector 6. The positive electrode current collector 6 includes one first positive electrode current collector 61 and three second positive electrode current collectors 62. These three second positive electrode current collectors 62 correspond to the respective electrode bodies 3. The negative electrode terminal 9 is electrically connected to the negative electrode tab group 50 through a negative electrode current collector 7. The negative electrode current collector 7 includes one first negative electrode current collector 71 having the same shape as that of the first positive electrode current collector 61 and three second negative electrode current collectors 72 having the same shape as that of the second positive electrode current collector 62. These three second negative electrode current collectors 72 correspond to the respective electrode bodies 3.

The first positive electrode current collector 61 has a substantially L-shaped cross section, and is arranged between the electrode body 3 and the sealing plate 2. The first positive electrode current collector 61 is connected to the positive electrode terminal 8.

The second positive electrode current collector 62 is arranged between the electrode body 3 and the first side wall 1b of the rectangular exterior body 1. Specifically, the second positive electrode current collector 62 is in a substantially flat plate shape parallel with the first side wall 1b, and extends toward the bottom 1a along the first side wall 1b. The second positive electrode current collector 62 is connected to the first positive electrode current collector 61.

As shown in FIG. 3, the second positive electrode current collector 62 has a current collector connection portion 62a, an inclined portion 62b, and a tab joint portion 62c. The current collector connection portion 62a is connected to the first positive electrode current collector 61. The positive electrode tab group 40 is connected to the tab joint portion 62c. The inclined portion 62b couples the current collector connection portion 62a and the tab joint portion 62c to each other such that the current collector connection portion 62a is positioned on the inner side of the electrode body 3 in the winding axis direction than the tab joint portion 62c, and is inclined with respect to both of the current collector connection portion 62a and the tab joint portion 62c. A step is formed between the current collector connection portion 62a and the tab joint portion 62c by the inclined portion 62b. Plate surfaces of the current collector connection portion 62a and the tab joint portion 62c face the winding axis direction of the electrode body 3. As shown in FIG. 6, the width W1 of the tab joint portion 62c of the second positive electrode current collector 62 in the thickness direction of the electrode body 3 is set to 10 mm.

The current collector connection portion 62a is provided with a recess 62d. The portion provided with the recess 62d is thinner than a peripheral portion thereof. The recess 62d is provided with a through-hole 62e. In the recess 62d, the current collector connection portion 62a is joined to the first positive electrode current collector 61.

Figure 9:
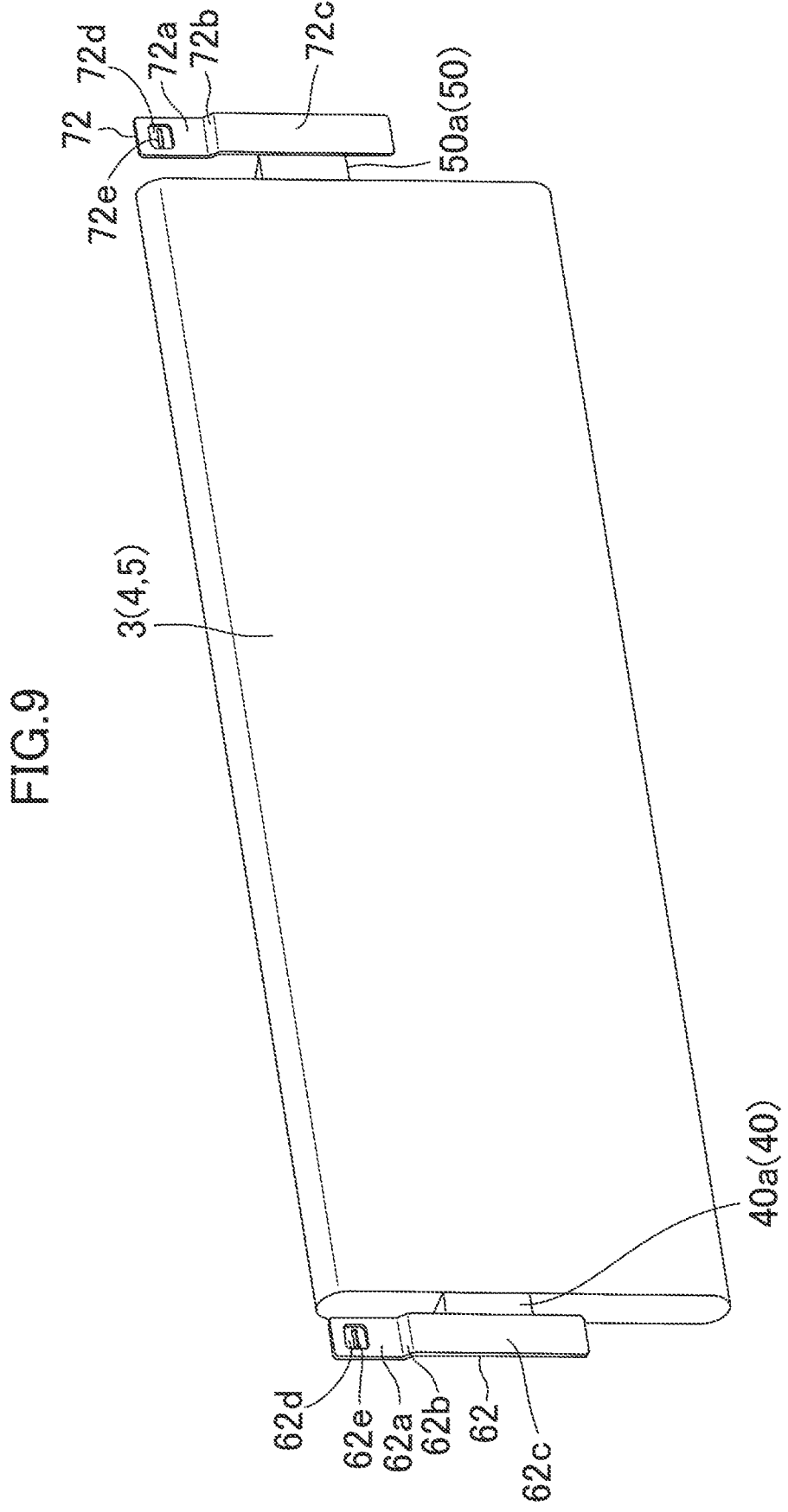
FIG. 9 is a perspective view of the electrode body before bending of the distal end regions of the positive electrode tabs.

As in the second positive electrode current collector 62, the second negative electrode current collector 72 also has a current collector connection portion 72a, an inclined portion 72b, and a tab joint portion 72c, as shown in FIG. 9. The current collector connection portion 72a is provided with a recess 72d and a through-hole 72e.

The first negative electrode current collector 71 and the second negative electrode current collector 72 are arranged bilaterally symmetrical to the first positive electrode current collector 61 and the second positive electrode current collector 62 about the center cross section of the electrode body 3 in the winding axis direction.

As shown in FIG. 6, an interval DI1 between the electrode body 3 and the tab joint portion 62c of the second positive electrode current collector 62 in the winding axis direction of the electrode body 3 is set to 5.0 mm which is equal to or less than ½ of the thickness TH of the electrode body 3.

As shown in FIG. 6, a distal end region including the connection portion 63 of all of the positive electrode tabs 40a configured as described above is bent to the second rear side wall 1e side (one side in the thickness direction of the electrode body 3) such that the plate surfaces face the plate thickness direction of the tab joint portion 62c of the second positive electrode current collector 62. In other words, the distal ends of all of the positive electrode tabs 40a forming the connection portion 63 face the second rear side wall 1e side. The connection portion 63 is welded to a surface of the tab joint portion 62c of the second positive electrode current collector 62 on an electrode body 3 side. The width W2 of the connection portion 63 in the thickness direction of the electrode body 3 is set to 3.0 mm.

The distal ends of all of the positive electrode tabs 40a forming the connection portion 63 overlap with the tab joint portion 62c in the plate thickness direction thereof. In other words, the distal ends of all of the positive electrode tabs 40a do not protrude from the tab joint portion 62c in the plate thickness direction thereof. Among the distal ends of all of the positive electrode tabs 40a forming the connection portion 63, a displacement in the thickness direction of the electrode body 3 between the distal end positioned closest to one side in the thickness direction of the electrode body 3 and the distal end positioned closest to the other side in the thickness direction of the electrode body 3 is equal to or less than 2.0 mm. The positions of the distal ends of all of the positive electrode tabs 40a in the thickness direction of the electrode body 3 coincide with each other in a preferred embodiment.

The connection portion 63 is positioned closer to the second front side wall 1d (the other side in the thickness direction of the electrode body 3) than the middle of the electrode body 3 in the thickness direction thereof.

As in the positive electrode tab group 40, the negative electrode tab group 50 is also welded to the second negative electrode current collector 72.

In FIG. 2, reference numeral 10 indicates an external insulating member arranged between the sealing plate 2 and the positive electrode terminal 8. Reference numeral 11 indicates an internal insulating member arranged between the sealing plate 2 and the first positive electrode current collector 61. Reference numeral 12 indicates an external insulating member arranged between the sealing plate 2 and the negative electrode terminal 9. Reference numeral 13 indicates an internal insulating member arranged between the sealing plate 2 and the first negative electrode current collector 71. Reference numeral 14 indicates a box-shaped or bag-shaped insulating sheet which is arranged inside the rectangular exterior body 1 and houses the electrode body 3. Reference numeral 15 indicates an electrolyte injection hole provided in the sealing plate 2. Reference numeral 16 indicates a sealing member sealing the electrolyte injection hole 15. Reference numeral 17 indicates a gas discharge valve provided at the sealing plate 2.

Next, the method for manufacturing the non-aqueous electrolyte secondary battery 20 and each configuration thereof will be described in detail.

[Attachment of Terminals and First Current Collectors to Sealing Plate]

The sealing plate 2 has a positive electrode terminal attachment hole in the vicinity of one end portion, and has a negative electrode terminal attachment hole in the vicinity of the other end portion. The external insulating member 10 is arranged on an outer surface side of the periphery of the positive electrode terminal attachment hole of the sealing plate 2, and the internal insulating member 11 and the first positive electrode current collector 61 are arranged on an inner surface side of the periphery of the positive electrode terminal attachment hole of the sealing plate 2. Then, the positive electrode terminal 8 is inserted, from the outer side of the battery, into a through-hole of the external insulating member 10, the positive electrode terminal attachment hole of the sealing plate 2, a through-hole of the internal insulating member 11, and a through-hole of the first positive electrode current collector 61. Then, the positive electrode terminal 8 is crimped onto the first positive electrode current collector 61. Further, the crimped portion of the positive electrode terminal 8 is welded to the first positive electrode current collector 61 in a more preferred embodiment.

The external insulating member 12 is arranged on an outer surface side of the periphery of the negative electrode terminal attachment hole of the sealing plate 2, and the internal insulating member 13 and the first negative electrode current collector 71 are arranged on an inner surface side of the periphery of the negative electrode terminal attachment hole of the sealing plate 2. Then, the negative electrode terminal 9 is inserted, from the outer side of the battery, into a through-hole of the external insulating member 12, the negative electrode terminal attachment hole of the sealing plate 2, a through-hole of the internal insulating member 13, and a through-hole of the first negative electrode current collector 71. Then, the negative electrode terminal 9 is crimped onto the first negative electrode current collector 71. Further, the crimped portion of the negative electrode terminal 9 is welded to the first negative electrode current collector 71 in a more preferred embodiment.

FIGS. 7A and 7B are perspective views of the sealing plate 2 to which the positive electrode terminal 8, the first positive electrode current collector 61, the negative electrode terminal 9, and the first negative electrode current collector 71 are attached. FIG. 7A shows the outer side of the battery, and FIG. 7B shows the inner side of the battery.

The first positive electrode current collector 61 has a first region 61a arranged along the sealing plate 2 and a second region 61b bent from an end portion of the first region 61a. In the state of the non-aqueous electrolyte secondary battery 20, the first region 61a is arranged between the sealing plate 2 and the electrode body 3. The second region 61b extends from the first region 61a to the bottom 1a of the rectangular exterior body 1. The second region 61b is arranged between the first side wall 1b of the rectangular exterior body 1 and the electrode body 3.

The first negative electrode current collector 71 has a first region 71a arranged along the sealing plate 2 and a second region 71b bent from an end portion of the first region 71a. In the state of the non-aqueous electrolyte secondary battery 20, the first region 71a is arranged between the sealing plate 2 and the electrode body 3. The second region 71b extends from the first region 71a to the bottom 1a of the rectangular exterior body 1. The second region 71b is arranged between the first side wall 1c of the rectangular exterior body 1 and the electrode body 3.

In the second region 61b of the first positive electrode current collector 61, cutout portions 61c are provided at both end portions in the width direction in a preferred embodiment. When the second positive electrode current collectors 62, which will be described later, are connected to the second region 61b, the cutout portions 61c are gripped so that welding can be more stably performed and a higher-quality connection portion can be stably formed. In the second region 61b, the cutout portion 61c is arranged closer to the bottom 1a of the rectangular exterior body 1 than the internal insulating member 11 is to the bottom 1a in a preferred embodiment. In the second region 61b, the cutout portion 61c is provided in the vicinity of an end portion on a first region 61a side in a preferred embodiment. In the second region 71b of the first negative electrode current collector 71, cutout portions 71c are also provided at both end portions in the width direction in a preferred embodiment. In a case where the internal insulating member 11 has a wall portion covering part of the second region 61b, the cutout portion 61c has a region not covered with the wall portion of the internal insulating member 11 in a preferred embodiment.

The positive electrode terminal 8 and the first positive electrode current collector 61 are made of metal in a preferred embodiment and aluminum in a more preferred embodiment. The negative electrode terminal 9 and the first negative electrode current collector 71 are made of metal in a preferred embodiment and copper in a more preferred embodiment. The negative electrode terminal 9 may include a region made of aluminum and a region made of copper. In this case, the region made of copper is connected to the first negative electrode current collector 71 made of copper and the region made of aluminum is exposed on the outer side of the battery in a preferred embodiment.

[Positive Electrode Plate]

First, the method for manufacturing the positive electrode plate will be described.

[Preparation of Positive Electrode Active Material Layer Slurry]

Lithium nickel cobalt manganese composite oxide as a positive electrode active material, polyvinylidene fluoride (PVdF) as a binder, a carbon material as an electroconductive material, and N-methyl-2-pyrrolidone (NMP) as a dispersion medium are kneaded at a mass ratio of the lithium nickel cobalt manganese composite oxide:the PVdF:the carbon material of 97.5:1:1.5. In this manner, a positive electrode active material layer slurry is prepared.

[Preparation of Positive Electrode Protective Layer Slurry]

An alumina powder, a carbon material as an electroconductive material, polyvinylidene fluoride (PVdF) as a binder, and N-methyl-2-pyrrolidone (NMP) as a dispersion medium are kneaded at a mass ratio of the alumina powder:the carbon material:the PVdF of 83:3:14. In this manner, a protective layer slurry is prepared.

[Formation of Positive Electrode Active Material Layer and Positive Electrode Protective Layer]

To both surfaces of aluminum foil as a positive electrode core, the positive electrode active material layer slurry and the positive electrode protective layer slurry prepared by the above-described method are applied using a die coater. At this time, the positive electrode active material layer slurry is applied to the center of the positive electrode core in the width direction thereof. Further, the positive electrode protective layer slurry is applied to end portions of a region in the width direction thereof. The positive electrode active material layer slurry is applied to the region.

The positive electrode core with the positive electrode active material layer slurry and the positive electrode protective layer slurry applied thereon is dried to remove NMP contained in the positive electrode active material layer slurry and the positive electrode protective layer slurry. Accordingly, a positive electrode active material layer and a positive electrode protective layer are formed. Then, the positive electrode active material layer is compressed, thereby obtaining a positive electrode original plate. The positive electrode original plate is cut into a predetermined shape, thereby obtaining the positive electrode plate 4. The cutting of the positive electrode original plate may be performed by irradiation with energy rays such as laser, a die, a cutter, or the like.

[Negative Electrode Plate]

Next, the method for manufacturing the negative electrode plate will be described.

[Preparation of Negative Electrode Active Material Layer Slurry]

Graphite as a negative electrode active material, styrene-butadiene rubber (SBR) and carboxymethyl cellulose (CMC) as a binder, and water as a dispersion medium are kneaded at a mass ratio of graphite:SBR:CMC of 98:1:1. In this manner, a negative electrode active material layer slurry is prepared.

[Formation of Negative Electrode Active Material Layer]

To both surfaces of copper foil as a negative electrode core, the negative electrode active material layer slurry prepared by the above-described method is applied using a die coater.

The negative electrode core with the negative electrode active material layer slurry applied thereon is dried to remove water in the negative electrode active material layer slurry. In this manner, a negative electrode active material layer is formed. Thereafter, the negative electrode active material layer is compressed, thereby obtaining a negative electrode original plate. The negative electrode original plate is cut into a predetermined shape, thereby obtaining the negative electrode plate 5. The cutting of the negative electrode original plate may be performed by irradiation with energy rays such as laser, a die, a cutter, or the like.

[Preparation of Electrode Body]

The strip-like positive electrode plate 4 and the strip-like negative electrode plate 5 prepared by the above-described method are wound with the strip-like separator SP made of polyolefin interposed therebetween, thereby preparing the flat wound electrode body 3. The electrode body 3 has a flat region at the center, and has curved portions at both ends of the flat region.

The positive electrode tab group 40 including the multiple positive electrode tabs 40a stacked on each other is provided at one end of the electrode body 3 in a direction in which the winding axis extends. The negative electrode tab group 50 including the multiple negative electrode tabs 50a stacked on each other is provided at the other end of the electrode body 3 in the direction in which the winding axis extends. In the direction perpendicular to the direction in which the winding axis of the electrode body 3 extends and perpendicular to the thickness direction of the electrode body 3, the center of the positive electrode tab group 40 and the center of the negative electrode tab group 50 are arranged shifted from the winding axis to one side.

The shape of the positive electrode tab 40a and/or the negative electrode tab 50a in plan view is set to a shape having a width gradually increasing from a distal end to a base, and with this shape, damage to the positive electrode tab 40a and/or the negative electrode tab 50a can be reduced even in a case where impact or vibration is applied to the non-aqueous electrolyte secondary battery 20. In addition, it is more effective to form the corner portion of the base portion in a rounded shape.

The positive electrode protective layer 4b is provided at the base portion of the positive electrode tab 40a as described above so that damage to the positive electrode tab 40a can be reduced. In addition, the negative electrode active material layer is provided at the base portion of the negative electrode tab 50a so that damage to the negative electrode tab 50a can be reduced.

[Connection Between First Current Collector and Tab Group]

Figure 8:
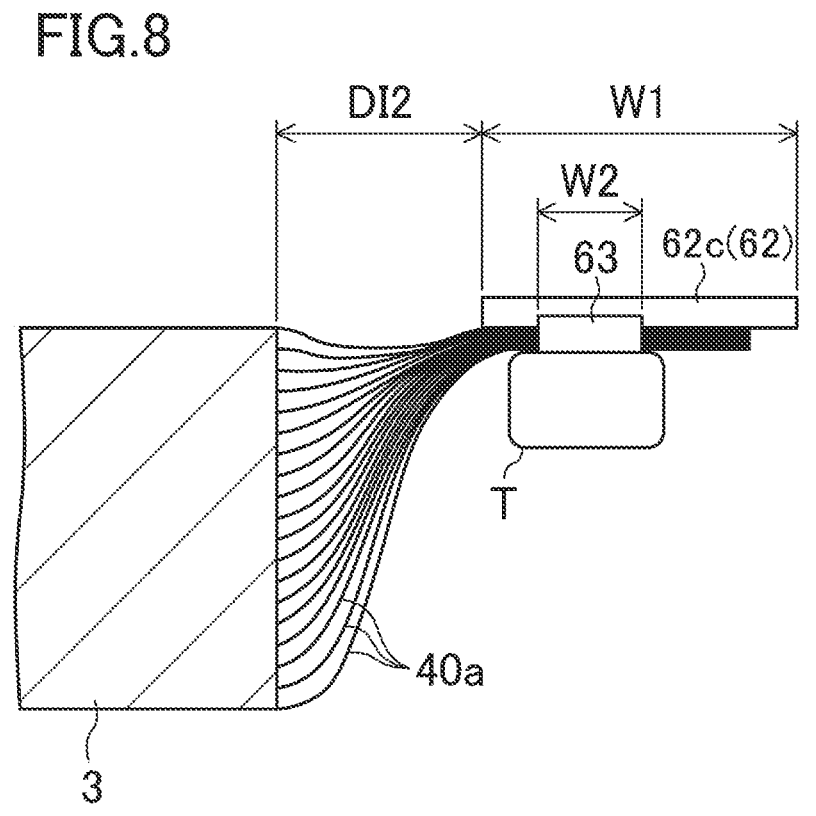

In order to manufacture the non-aqueous electrolyte secondary battery 20 configured as described above, welding is performed with a welding tool T in contact with a position slightly lower than the tip ends of all of the positive electrode tabs 40a, with the distal end regions of all of the positive electrode tabs 40a overlaid on the tab joint portion 62c of the second positive electrode current collector 62, as shown in FIG. 8. In this manner, all of the positive electrode tabs 40a are joined to each other, and are welded to the second positive electrode current collector 62. Accordingly, the portion slightly lower than the distal ends of all of the positive electrode tabs 40a form the connection portion 63. The connection portion 63 may be formed at the tip end portions of all of the positive electrode tabs 40a by welding performed with the welding tool T in contact with the distal end portions of all of the positive electrode tabs 40a. In this case, the tab joint portion 62c of the second positive electrode current collector 62 is provided such that the plate surfaces thereof face the thickness direction of the electrode body 3, as shown in FIG. 9. In addition, the distal end regions of all of the positive electrode tabs 40a overlap with each other with the plate surfaces of all of the positive electrode tabs 40a face the thickness direction of the electrode body 3 and the positive electrode tabs 40a gathered toward the positive electrode tab 40a (one end side in the thickness direction of the electrode body 3) with the shortest protrusion length. In this case, an interval DI2 between the electrode body 3 and the tab joint portion 62c of the second positive electrode current collector 62 is set to 6 mm, and all of the positive electrode tabs 40a are bent.

In this case, at the tab joint portion 62c of the second positive electrode current collector 62, the connection portion 63 is arranged closer to the base side (the left side in FIG. 8) of the positive electrode tab group 40 in the width direction (the left-right direction in FIG. 8) of the tab joint portion 62c in a preferred embodiment. With this configuration, when the positive electrode tab group 40 is bent, a curved shape can be more reliably and stably formed in the vicinity of the base of the positive electrode tab group 40. This can reduce damage to the positive electrode tab group 40. In addition, even with displacement of the positive electrode tabs 40a, the positive electrode tab group 40 and the tab joint portion 62c can be stably joined to each other.

In a preferred embodiment, a lower end portion (an end portion closer to the bottom 1a of the rectangular exterior body 1) of the second positive electrode current collector 62 is positioned lower than a lower end portion (an end portion closer to the bottom 1a of the rectangular exterior body 1) of the positive electrode tab group 40. With this configuration, the positive electrode tab group 40 can be more reliably and stably bent in the process of bending the positive electrode tab group 40 as described later.

From this state, the distal end regions of all of the positive electrode tabs 40a are, as shown in FIG. 6, bent so that the plate surfaces thereof face the substantially winding axis direction of the electrode body 3 (e.g., the inclination of the tab joint portion 62c with respect to the winding axis is less than ±15°. Accordingly, the plate surfaces of the tab joint portion 62c of the second positive electrode current collector 62 face the substantially winding axis direction of the electrode body 3. As described above, the positive electrode tab group 40 can be bent without bending the second positive electrode current collector 62.

The negative electrode tabs 50a are also attached to the second negative electrode current collector 72 in a manner similar to that for the positive electrode tabs 40a.

[Electrode Body Group]

As shown in FIG. 3, the multiple electrode bodies 3 each provided with a positive electrode tab group 40 and a negative electrode tab group 50 being bent are stacked on each other, and are fixed by an electrode body fixer such as a tape. The positive electrode tab groups 40 are arranged on the same side, and the negative electrode tab groups 50 are arranged on the same side. In the electrode bodies 3, the positive electrode tab groups 40 are bent in the same direction. In the electrode bodies 3, the negative electrode tab groups 50 are bent in the same direction.

In the direction in which the electrode bodies 3 are stacked, the second positive electrode current collectors 62 attached to the respective electrode bodies 3 are arranged at an interval and connected to the second region 61b of the first positive electrode current collector 61. The same applies to the second negative electrode current collector 72.

[Connection Between First Current Collector and Second Current Collector]

The second region 61b of the first positive electrode current collector 61 is arranged inside the current collector connection portion 62a of the second positive electrode current collector 62, and the second region 71b of the first negative electrode current collector 71 is arranged inside the current collector connection portion 72a of the second negative electrode current collector 72. Then, the second region 61b of the first positive electrode current collector 61 and the current collector connection portion 62a of the second positive electrode current collector 62 are joined to each other. In addition, the second region 71b of the first negative electrode current collector 71 is joined to the current collector connection portion 72a of the second negative electrode current collector 72. As the joining method, ultrasonic welding (ultrasonic joining), resistance welding, welding by irradiation with high-energy rays such as laser, and the like may be used. Particularly, welding by irradiation with high-energy rays such as laser is used in a preferred embodiment.

Figure 10A:
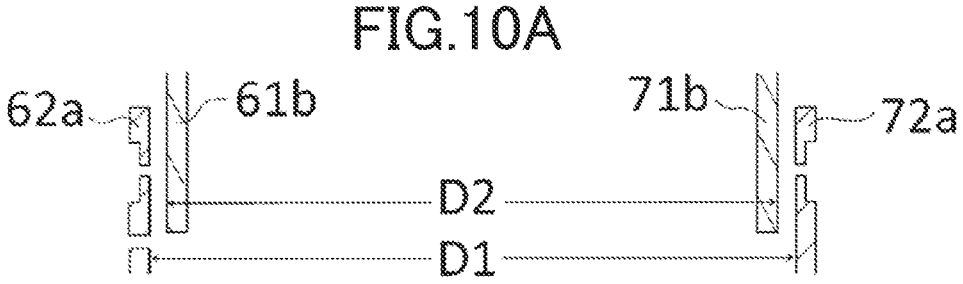
FIG. 10A is a view of a state in which the first positive electrode current collector and the first negative electrode current collector are arranged between a second positive electrode current collector and a second negative electrode current collector.
Figure 10B:
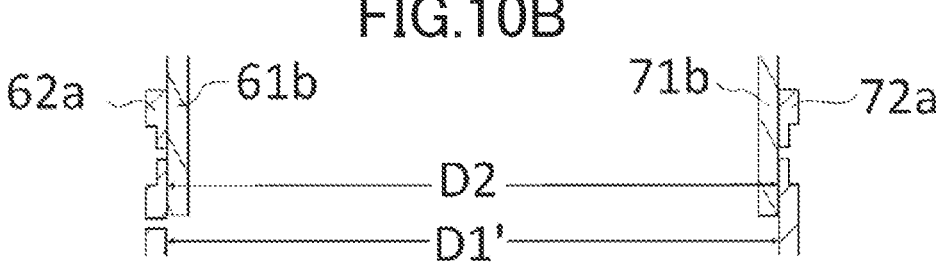
FIG. 10B is a view of a state in which a distance between the second positive electrode current collector and the second negative electrode current collector is decreased.
Figure 10C:
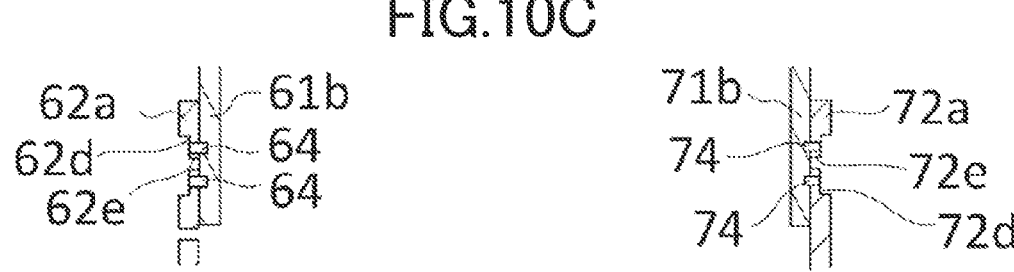
FIG. 10C is a view of a state after the first positive electrode current collector and the second positive electrode current collector have been connected to each other and the first negative electrode current collector and the second negative electrode current collector have been connected to each other.

FIGS. 10A to 10C are cross-sectional views taken along the winding axis of the electrode body 3. FIGS. 10A to 10C show the second region 61b of the first positive electrode current collector 61, the second region 71b of the first negative electrode current collector 71, the current collector connection portion 62a of the second positive electrode current collector 62, and the current collector connection portion 72a of the second negative electrode current collector 72 at each stage.

As shown in FIG. 10A, the second region 61b of the first positive electrode current collector 61 and the second region 71b of the first negative electrode current collector 71 are arranged between the current collector connection portion 62a of the second positive electrode current collector 62 and the current collector connection portion 72a of the second negative electrode current collector 72. In this state, a distance D1 between an inner surface of the current collector connection portion 62a and an inner surface of the current collector connection portion 72a is greater than a distance D2 between an outer surface of the second region 61b and an outer surface of the second region 71b in a preferred embodiment. D1 is preferably greater than D2 by 0.1 mm to 5 mm and more preferably by 0.2 mm to 3 mm.

Next, as shown in FIG. 10B, the current collector connection portion 62a and/or the current collector connection portion 72a are displaced inwardly such that the distance between the current collector connection portion 62a and the current collector connection portion 72a decreases. Accordingly, the distance D1 between the inner surface of the current collector connection portion 62a and the inner surface of the current collector connection portion 72a changes to D1'. In this case, a difference between D2 and D1' is preferably 0 mm to 0.2 mm.

In the state shown in FIG. 10B, each of the current collector connection portion 62a and the current collector connection portion 72a is irradiated with high-energy rays such as laser. Accordingly, the second region 61b of the first positive electrode current collector 61 and the current collector connection portion 62a of the second positive electrode current collector 62 are joined to each other by welding, and the second region 71b of the first negative electrode current collector 71 and the current collector connection portion 72a of the second negative electrode current collector 72 are joined to each other by welding.

As shown in FIG. 10C, a joint portion 64 as a welding portion between the second region 61b and the current collector connection portion 62a is formed in the recess 62d. In addition, a joint portion 74 as a welding portion between the second region 71b and the current collector connection portion 72a is formed in the recess 72d.

According to the processes of FIGS. 10A to 10C, by a simpler method, the first positive electrode current collector 61 and the second positive electrode current collector 62 can be more stably welded to each other, and the first negative electrode current collector 71 and the second negative electrode current collector 72 can be more stably welded to each other. Thus, the joint portion 64 and the joint portion 74 can be formed with a high reliability.

The portion formed with the recess 62d, 72d is thinner than a peripheral portion thereof. Welding is performed such that the joint portion 64, 74 is formed at such a thin portion, and therefore, a higher-quality joint portion can be more stably formed. Thus, a secondary battery with a higher reliability is provided. Using the through-hole 62e, the presence or absence of a clearance between the second region 61b and the current collector connection portion 62a and the size of the clearance are measured. Thus, the second region 61b and the current collector connection portion 62a can be more stably joined to each other by welding. The same applies to the through-hole 72e.

FIG. 3 is a perspective view showing a state after the first positive electrode current collector 61 and the second positive electrode current collectors 62 have been connected to each other and the first negative electrode current collector 71 and the second negative electrode current collectors 72 have been connected to each other.

[Electrode Body Holder]

Figure 11:
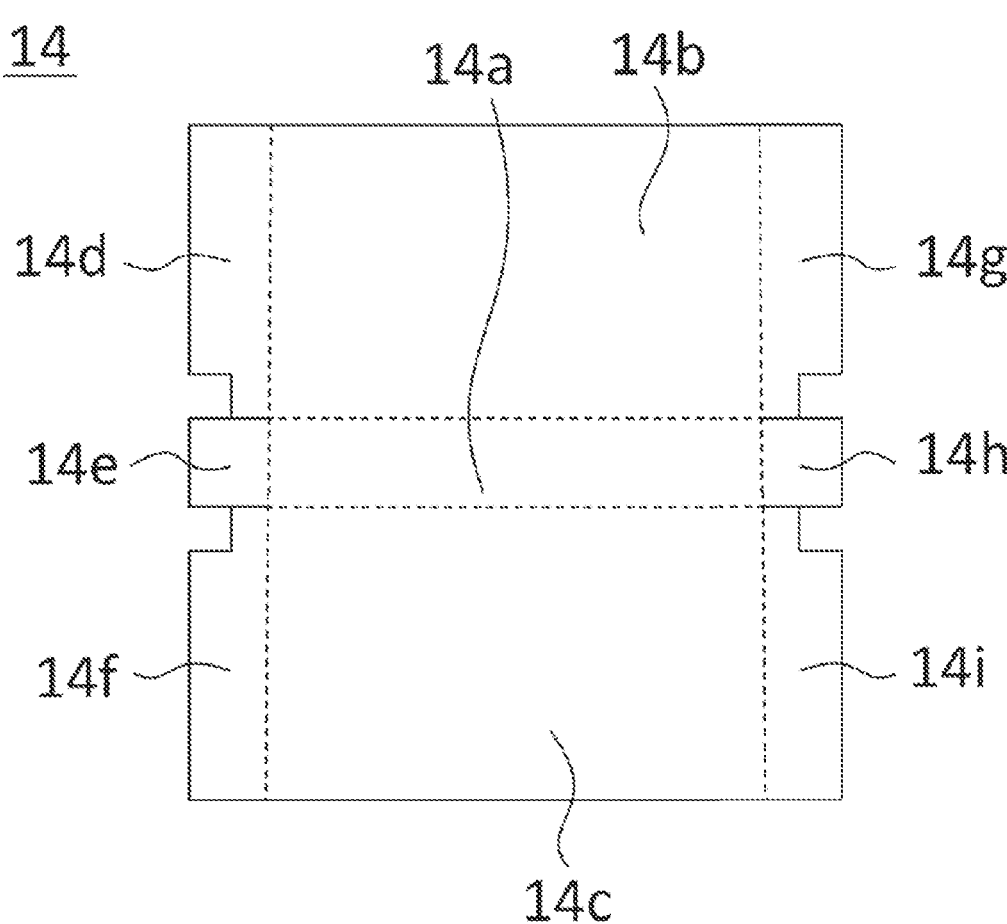
FIG. 11 is a development view of an electrode body holder.

FIG. 11 is a development view of an electrode body holder 14. The box-shaped electrode body holder 14 is formed in such a manner that an insulating sheet forming the electrode body holder 14 is bent at portions indicated by broken lines in FIG. 11. The electrode body holder 14 has a holder bottom 14a, a holder first principal surface 14b, a holder second principal surface 14c, a holder first side surface 14d, a holder second side surface 14e, a holder third side surface 14f, a holder fourth side surface 14g, a holder fifth side surface 14h, and a holder sixth side surface 14i.

In a case where the electrode body holder 14 is in the box shape, the electrode body holder 14 has a region where the holder first side surface 14d, the holder second side surface 14e, and the holder third side surface 14f overlap with each other, and has a region where the holder fourth side surface 14g, the holder fifth side surface 14h, and the holder sixth side surface 14i overlap with each other.

In a state in which three electrode bodies 3 are arranged in the box-shaped electrode body holder 14, these three electrode bodies 3 are inserted into the rectangular exterior body 1. Then, the sealing plate 2 is joined to the rectangular exterior body 1 to seal the opening of the rectangular exterior body 1 with the sealing plate 2. An electrolyte is then injected from the electrolyte injection hole 15 provided in the sealing plate 2, and the electrolyte injection hole 15 is sealed with a sealing member 16. Thus, the non-aqueous electrolyte secondary battery 20 is obtained.

According to the present embodiment, two positive electrode tabs 40a are provided per turn of the positive electrode plate 4. Thus, as compared to a case where only one positive electrode tab 40a is provided per turn of the positive electrode plate 4, variation in a distance from each portion in the positive electrode plate 4 to the positive electrode tab 40a can be reduced and a potential difference in the positive electrode plate 4 can be reduced. Accordingly, deterioration of the positive electrode plate 4 is reduced, and the durability of the non-aqueous electrolyte secondary battery 20 is enhanced.

In addition, as compared to the case where only one positive electrode tab 40a is provided per turn of the positive electrode plate 4, the current collection resistance of the positive electrode plate 4 can be reduced. Thus, the output current of the non-aqueous electrolyte secondary battery 20 can be increased.

Similarly, two negative electrode tabs 50a are provided per turn of the negative electrode plate 5. Thus, as compared to a case where only one negative electrode tab 50a is provided per turn of the negative electrode plate 5, variation in a distance from each portion in the negative electrode plate 5 to the negative electrode tab 50a can be reduced and a potential difference in the negative electrode plate 5 can be reduced. Accordingly, deterioration of the negative electrode plate 5 is reduced, and the durability of the non-aqueous electrolyte secondary battery 20 is enhanced.

In addition, as compared to the case where only one negative electrode tab 50a is provided per turn of the negative electrode plate 5, the current collection resistance of the negative electrode plate 5 can be reduced. Thus, the output current of the non-aqueous electrolyte secondary battery 20 can be increased.

The distal ends of all of the positive electrode tabs 40a forming the connection portion 63 overlap with the tab joint portion 62c in the plate thickness direction thereof. This can prevent the distal ends of the positive electrode tabs 40a from protruding from the tab joint portion 62c and contacting the adjacent electrode body 3. A restriction member, such as a tape, for restricting contact of portions of the positive electrode tab 40a protruding from the tab joint portion 62c with the adjacent electrode body 3 is not necessarily provided, and therefore, the number of components can be reduced and the effort of assembling the restriction member can be eliminated as compared to a case where the restriction member is provided.

Among the distal ends of all of the positive electrode tabs 40a forming the connection portion 63, the displacement in the thickness direction of the electrode body 3 between the distal end positioned closest to one side in the thickness direction of the electrode body 3 and the distal end positioned closest to the other side in the thickness direction of the electrode body 3 is equal to or less than 2.0 mm. Thus, as compared to a case where the displacement exceeds 2.0 mm, the process of welding the positive electrode tabs 40a to the second positive electrode current collector 62 is facilitated. Similarly, the welding process of welding the negative electrode tabs 50a to the second negative electrode current collector 72 is also facilitated.

The protrusion length L2 of the positive electrode tab 40a protruding from position closest to the second rear side wall 1e among all of the positive electrode tabs 40a forming the connection portion 63 is longer than the protrusion length L1 of the positive electrode tab 40a protruding from position closest to the second front side wall 1d among all of the positive electrode tabs 40a forming the connection portion 63. Thus, even if the connection portion 63 is arranged closer to the second front side wall 1d with respect to the center of the electrode body 3 in the thickness direction thereof, a displacement in the thickness direction of the electrode body 3 between the distal end of the positive electrode tab 40a protruding from position closest to the second rear side wall 1e and the distal end of the positive electrode tab 40a protruding from position closest to the second front side wall 1d can be decreased. A similar effect can be obtained for the negative electrode tabs 50a.

The protrusion lengths of the positive electrode tabs 40a forming the connection portion 63 gradually increase toward the second rear side wall 1e side. Thus, even if the connection portion 63 is arranged closer to the second front side wall 1d of the electrode body 3 with respect to the center of the electrode body 3 in the thickness direction thereof, a displacement among the distal ends of all of the positive electrode tabs 40a in the thickness direction of the electrode body 3 can be decreased. A similar effect can be obtained for the negative electrode tabs 50a.

The proximal end widths TW of the positive electrode tabs 40a forming the connection portion 63 increase as the protrusion lengths of the positive electrode tabs 40a increase. Thus, as compared to a case where the proximal end widths TW of the positive electrode tabs 40a are equal, current flowing in the positive electrode tabs 40a can be uniformized regardless of the protrusion lengths without increasing the resistance of the positive electrode tabs 40a having longer protrusion lengths. A similar effect can be obtained for the negative electrode tabs 50a.

The positive electrode current collector 6 is configured to include the first positive electrode current collector 61 and the second positive electrode current collector 62. Thus, when the positive electrode tab group 40 is bent, the positive electrode tab group 40 can be bent without bending the positive electrode current collector 6, and a secondary battery with a higher volume energy density can be more stably provided by a simpler method. Even in a case where the number of electrode bodies 3 housed in the battery case 100 is greater than two, a secondary battery with a high reliability can be stably manufactured without forming the positive electrode current collector 6 in a complicated shape. Thus, the degree of freedom in the number of electrode bodies 3 housed in the battery case 100 is improved.

The tab joint portion 62c of the second positive electrode current collector 62 is arranged closer to the first side wall 1b of the rectangular exterior body 1 than the current collector connection portion 62a of the second positive electrode current collector 62 is to the first side wall 1b. With this configuration, a space between the first side wall 1b and the electrode body 3 can be more effectively used. Thus, an electric power generation portion of the electrode body 3 can be increased in size, and a secondary battery with a higher volume energy density is provided. The same applies to the second negative electrode current collector 72.

In the electrode body 3, the positive electrode tab group 40 is positioned closer to the sealing plate 2 in a preferred embodiment. Accordingly, an electroconductive path from the positive electrode tab group 40 to the positive electrode terminal 8 can be shortened, and the non-aqueous electrolyte secondary battery 20 with a lower internal resistance is provided. In the electrode body 3, the negative electrode tab group 50 is positioned closer to the sealing plate 2 in a preferred embodiment. Accordingly, an electroconductive path from the negative electrode tab group 50 to the negative electrode terminal 9 can be shortened, and the non-aqueous electrolyte secondary battery 20 with a lower internal resistance is provided.

In a preferred embodiment, an insulating member different from the electrode body holder 14 is arranged between the region where the second region 61b of the first positive electrode current collector 61 and the current collector connection portion 62a of the second positive electrode current collector 62 overlap with each other and the first side wall 1b of the rectangular exterior body 1. In a preferred embodiment, an insulating member different from the electrode body holder 14 is arranged between the region where the second region 71b of the first negative electrode current collector 71 and the current collector connection portion 72a of the second negative electrode current collector 72 overlap with each other and the first side wall 1c of the rectangular exterior body 1. With this configuration, even in a case where impact or vibration is applied to the non-aqueous electrolyte secondary battery 20, damage to the joint portion between the members, the positive electrode tab group 40, and the negative electrode tab group 50 can be reduced.

OTHER EMBODIMENTS

The above-described embodiment is an example of the invention of the present application, and the invention of the present application is not limited to such an example. Well-known techniques, commonly used techniques, and publicly known techniques may be combined or partially replaced with this example. Further, the invention of the present application encompasses any modification easily conceivable by those skilled in the art.

In the above-described embodiment, the present invention is applied to the non-aqueous electrolyte secondary battery 20 including three electrode bodies 3. However, the present invention is also applicable to a non-aqueous electrolyte secondary battery 20 including multiple electrode bodies 3 other than three electrode bodies 3 or only one electrode body 3.

In the above-described embodiment, two positive electrode tabs 40a per turn are provided at one edge of the positive electrode plate 4 in the winding axis direction of the electrode body 3. However, it may only be required that at least two positive electrode tabs 40a are provided per turn, and three or more positive electrode tabs 40a may be provided per turn. Similarly, it may only be required that at least two negative electrode tabs 50a per turn are provided at the other edge (on the side opposite to the positive electrode tab 40a) of the negative electrode plate 5 in the winding axis direction, and three or more negative electrode tabs 50a may be provided per turn.

In the above-described embodiment, the multiple positive electrode tabs 40a provided to protrude from the positive electrode plate 4 include the multiple types of positive electrode tabs 40a having different protrusion lengths and proximal end widths. However, the multiple positive electrode tabs 40a provided to protrude from the positive electrode plate 4 may include multiple types of positive electrode tabs 40a different from each other only in either one of the protrusion length or the base end width. For example, all of the positive electrode tabs 40a may have a common proximal end width. Similarly, the multiple negative electrode tabs 50a provided to protrude from the negative electrode plate 5 may include multiple types of negative electrode tabs 50a different from each other only in either one of the protrusion length or the proximal end width.

DESCRIPTION OF REFERENCE CHARACTERS

1 Rectangular Exterior Body
1b, 1c First Side Wall
2 Sealing Plate
3 Electrode Body
4 Positive Electrode Plate
5 Negative Electrode Plate
8 Positive Electrode Terminal
9 Negative Electrode Terminal
20 Non-Aqueous Electrolyte Secondary Battery
40a Positive Electrode Tab (Current Collection Tab)
50a Negative Electrode Tab (Current Collection Tab)
61 First Positive Electrode Current Collector
61a First Region
61b Second Region

62 Second Positive Electrode Current Collector
62c Tab Joint Portion
63 Connection Portion
71 First Negative Electrode Current Collector
71a First Region
71b Second Region
72 Second Negative Electrode Current Collector
72c Tab Joint Portion
SP Separator
L1, L2 Protrusion Length
DI1 Interval
TH Thickness
TW Width

The invention claimed is:

1. A secondary battery comprising:

an electrode body including a strip-like positive electrode plate, a strip-like negative electrode plate, and a strip-like separator, the positive electrode plate and the negative electrode plate being wound with the separator interposed therebetween, wherein at least two current collection tabs per turn are provided to protrude from one edge of the positive electrode plate in a winding axis direction of the electrode body and the other edge of the negative electrode plate in the winding axis direction, the multiple current collection tabs provided to protrude from the positive electrode plate include multiple types of current collection tabs different from each other in at least one of a protrusion length or a proximal end width, the multiple current collection tabs provided to protrude from the negative electrode plate include multiple types of current collection tabs different from each other in at least one of a protrusion length or a proximal end width, distal end portions or vicinities of distal ends of the multiple current collection tabs are joined to each other with plate surfaces thereof facing a substantially identical direction, and form a connection portion, a protrusion length of the current collection tab protruding from position closest to one side in the thickness direction of the electrode body among all of the current collection tabs forming the connection portion is longer than a protrusion length of the current collection tab protruding from position closest to the other side in the thickness direction of the electrode body among all of the current collection tabs forming the connection portion, and the connection portion is positioned closer to the other side in the thickness direction of the electrode body with respect to a center of the electrode body in the thickness direction thereof.

2. The secondary battery of claim 1, further comprising:

an exterior body having an opening and a pair of side walls arranged to face each other;

a sealing plate sealing the opening; and a terminal attached to the sealing plate, wherein the electrode body is in a flat shape, and is housed in the exterior body with the winding axis direction of the electrode body facing perpendicularly to the side walls, the current collection tabs and the terminal are electrically connected to each other by a first current collector and a second current collector, the first current collector includes a first region arranged between the sealing plate and the electrode body and a second region bent from an end portion of the first region and arranged between one of the side walls and the electrode body, the second current collector has a plate-shaped tab joint portion provided such that a plate surface thereof faces the winding axis direction of the electrode body, the connection portion is welded to an electrode body-side surface of the tab joint portion of the second current collector, a distal end region including the connection portion of the multiple current collection tabs is bent to one side in a thickness direction of the electrode body such that a plate surface thereof faces a plate thickness direction of the tab joint portion of the second current collector, distal ends of all of the current collection tabs forming the connection portion overlap with the tab joint portion in the plate thickness direction thereof, and the second current collector is welded to the second region of the first current collector.

3. The secondary battery of claim 2, wherein among the distal ends of all of the current collection tabs forming the connection portion, a displacement in the thickness direction of the electrode body between the distal end positioned closest to one side in the thickness direction of the electrode body and the distal end positioned closest to the other side in the thickness direction of the electrode body is equal to or less than 2.0 mm.

4. The secondary battery of claim 1, wherein protrusion lengths of the current collection tabs forming the connection portion gradually increase to the one side in the thickness direction of the electrode body.

5. The secondary battery of claim 1, wherein proximal end widths of the current collection tabs forming the connection portion increase as the protrusion lengths of the current collection tabs increase.

6. The secondary battery of claim 1, wherein an interval between the electrode body and the tab joint portion of the second current collector in the winding axis direction is set to equal to or less than ½ of a thickness of the electrode body.

\* \* \* \* \*